United States Patent Office 3,370,997
Patented Feb. 27, 1968

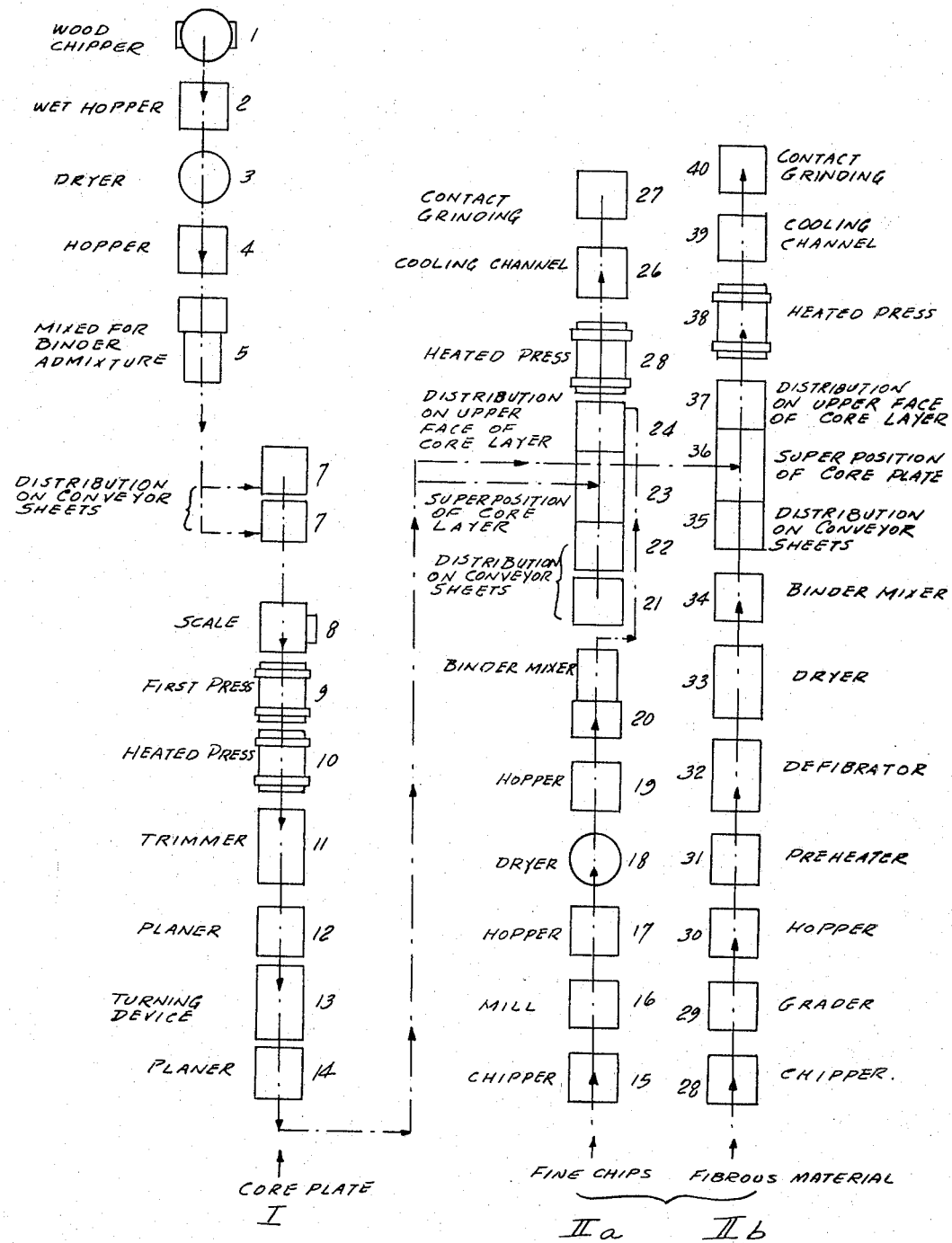

3,370,997
METHOD OF PRODUCING COMPOSITE PLATES
Walter Hoppeler, Hans Lampitschen,
Klosters, Graubunden, Switzerland
Continuation-in-part of application Ser. No. 194,449,
May 14, 1962. This application Oct. 23, 1965, Ser.
No. 503,985
The portion of the term of the patent subsequent to
Mar. 29, 1983, has been disclaimed
10 Claims. (Cl. 156—62.8)

The present application is a continuation-in-part of my copending application Ser. No. 194,449, now Patent No. 3,243,327, filed May 14, 1962, and entitled Pressed Plate and Method of Making the Same.

The present invention relates to a method of producing composite plates and, more particularly, the present invention is concerned with a method of producing pressed, composite plates of the type which are produced of wood particles and binder material forming the core portion of the plate, and cover or surface layers which may or may not consist of wood particles and binder material covering at least one face of the core plate. These plates are conventionally produced by jointly compressing at elevated pressure and preferably elevated temperature the various binder material-containing layers which are to form the composite plate.

The thus-produced plates do not possess the desired uniform and even, planar surface or surfaces and, for this reason, one or both surfaces of thus-produced composite plates are subjected to the removal of portions of the surface, by deep grinding or, preferably, by planing which may be followed by slight grinding of the planed surface.

However, the various methods of producing composite plates of substantially uniform thickness having even and at least substantially parallel opposite surfaces, or at least one even, planar surface, are all connected with the disadvantage that the planing or evening of the surface of the compressed composite plate is carried out by removing material from the surface of one or both of the outer or surface layers of the composite plate. The material costs of the outer layers of such composite plates are higher than the costs of the material of which the core portion of the composite plate is formed since, for instance, the quality of the fine wood chips which may form the surface layers of the composite plate will be higher than the quality of the wood chips used for forming the core portions and, furthermore, the proportion of binder material will be higher in the outer or surface layers of the composite plate. Consequently, the above-described prior art methods are highly uneconomical, inasmuch as differences in the thickness of the cheaper and generally much thicker core or center layer must be evened out by grinding or planing away a portion of the expensive outer layers of the composite plates, i.e. by removing material which is considerably more expensive than that of which the core layer of the plate is formed.

By grinding the surface layers of the plate so as to even out the thickness of the same, depending on the thickness of the plate, between 5 and 20% grinding dust of the weight of the plate will accrue. By planing of the outer layers of the composite plate, followed by grinding, about one-half or two-thirds of the above-mentioned amount will accrue as shavings and the balance again as grinding dust.

Although hot planing as described in my copending application Ser. No. 194,449 has resulted in the great advantage that about half of the material, which has to be removed from the outer surface of the composite compressed plate in order to obtain a plate with parallel, planar surfaces, will accrue as valuable planing shavings or chips which may be immediately reused for forming subsequent composite compressed plates, nevertheless between 5 and 20% of grinding dust will accrue which dust is difficult to admix to the compressible mass and which requires large quantities of binder material and consequently is not a very desirable raw material or component in the manufacture of composite compressed plates.

It is therefore an object of the present invention to overcome the above-discussed disadvantages and difficulties.

It is a further object of the present invention to provide a method for producing composite compressed plates, for instance of the type described in my copending application Ser. No. 194,449, which have perfectly even, planar, parallel surfaces and which can be produced without requiring the removal of an uneven surface portion of the more valuable material of the surface layers of the compressed plate.

Other objects and advantages of the present invention will become apparent from a further reading of the description and of the appended claims.

With the above and other objects in view, the present invention contemplates a method of producing a composite plate of substantially uniform thickness, comprising the steps of transformer a layer consisting of a deformable, hardenable mass into a solid plate so that the opposite surfaces of the plate are substantially parallel but uneven, removing surface portions from at least one of the opposite surfaces of the solid plate so as to convert the same into an even surface, and forming on the even surface of the solid plate, firmly adhering thereto, a solid layer of uniform thickness, whereby a composite plate having at least one even, planar surface is formed.

Thus, the present invention proposes to overcome the above-discussed difficulties and disadvantages, and to reduce the costs of producing compressed, composite plates, by carrying out the planing of the compressed plate, and thus the forming of even and parallel planar surfaces, by forming such even planar surface or opposite surfaces on the first pressed core plate or portion of the composite plate, and thereafter forming the—relatively thin—surface layers on the thus produced even surface or surfaces of the core plate. In other words, after first planing or otherwise forming one, or two opposite, even and planar surfaces on the core plate, which may also result in the loss of surface portions of the core plate, i.e., of relatively inexpensive material, one or more layers of particulate material such as chips or fibers, in combination with binder material are applied to the even and planar surface, or the two opposite even and planar surfaces of the core plate by conventional dry, semi-wet or wet methods.

By way of example, the present invention may be carried out for instance in the following manner.

In a conventional arrangement for producing compressed plates, a mixture of chips for forming the core layer is prepared, mixed with a latently adhesive binder material which may be heated-activated, and then applied in layers on a support. This layer is then passed into a heated press wherein it is converted into a solid plate which eventually will form the core portion of the composite plate. The thus formed compressed core plate is then planed while still warm and thereafter passed to a distributor station in which the planed core plate is placed onto a thin layer of compressible material supported by a conventional conveyor sheet and consisting, for instance, of a layer of high quality cover layer chips and binder material, which layer may have a thickness of between about 0.5 and 3 mm., and thus, generally, will be considerably thinner than the core plate which is superposed upon this layer. The conveyor sheet carrying the above described cover layer and the core plate passes then through a second distributor station at which on the upper free face of the planed core plate a thin layer of cover layer chips and binder material is formed. In this manner, the compressed core plate of even thickness throughout is placed between two thin layers adapted to form the outer, surfaces or cover layers of the composite plate. The core plate with the two layers on opposite faces thereof is then introduced into a heated press and compressed therein to form the finished three-layer composite compressed plate.

By suitably arranging the flow of the material, it is possible to carry out the hot pressing of the layer forming the core plate, as well as the final pressing of the core plate with the surface layers thereon, in one and the same heated press.

Quite obviously, it is also possible in this manner to produce composite plates which consist of more than the above-described three layers.

Due to the fact that the cover surface layers of the composite plate are relatively thin and the surfaces of the core layer are completely even and planar due to the prior planing of the same, it is not necessary to take material off the outer surfaces of the thus formed composite plate in order to obtain a plate of even thickness throughout. Thus, none of the more expensive material of the cover surface layers of the plate has to be removed. Unless a further treatment of the surfaces of the thus formed compressed composite plate is to be carried out, for instance a coating of the same with a synthetic resin, it is possible to use the composite compressed plate as produced, or in special cases, a slight grinding of the surface of the composite plate may be carried out, however, only to such a limited degree that it will not substantially affect the thickness of the plate. Such surface grinding—in contrast to body or deep grinding for the purpose of reducing the over-all thickness of the plate, as it would be necessary if the core portion of the plate would not have even, planar surfaces—will produce only a very small amount of grinding dust, namely an amount of a magnitude of about 1%–2% of the total weight of the compressed plate. It is made by a grinding band with a grain of 120–200.

The composite compressed plate produced according to the present invention may be subjected to a further surface treatment, for instance by applying a resin coating thereon, either by spraying or by means of resin-coated papers. It is also possible to apply a veneer to the plate. These further steps of treating or improving the surface of the composite plate according to the present invention preferably are carried out as an immediate continuation of the process of producing the composite plate as described above.

According to the present invention, it is possible to produce composite compressed plates in a much more economical manner, since the unavoidable differences in the thickness of the plate can be eliminated during production of the same by removal of the less expensive material of the core plate rather than by removal of the more expensive material of the surface layers of the composite plate.

The present invention is not limited to composite plates wherein the core portion and the surface layers are both formed of wood chips although of different size and quality. It is also within the scope of the present invention to produce the core plate as described above, and to replace the cover layers formed of wood chips and binder material, for instance, with a fibrous fleece of paper or glass fibers which in combination with heat activatable binder material is placed on the planed core plate. Such fibrous material, for instance, might be a water-softened cellulosic fiber material to which phenolic resin has been admixed and which is screened in conventional manner.

A great variety of combinations of planed core plates formed of wood chips and heat activatable binder material with surface layers or intermediate layers which may be applied by conventional liquid, semi-liquid or dry methods, may be formed.

Thus, a multilayer composite plate can be produced in accordance with the present invention and enjoying the advantages, particularly the greater economy of the present process, which multilayer plate will be more suitable for certain purposes and in any event can be more economically produced than plates of similar material, such as, for instance, plates having a surface layer or surface layers of a mass of paper fibers, for instance, like plates commercially available which are made as a whole from a mass of these paper fibers known under the trade name "Pavatex."

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which the figure is a schematic illustration of an arrangement for producing composite compressed plates in accordance with the present invention.

Referring now to the drawing, wood portions are introduced in conventional manner into wood chipper 1. The chips produced in wood chipper 1 will eventually form the core portion of the compressed plate. The thickness of the chips can be varied by suitable adjustment of the knives of chipper 1. The dimensions of the chips are dependent on the distance of the coring knives and the size of the wood portions introduced into chipper 1.

These chips which are to form the core portion of the pressed plate and which generally are not subjected to further milling, or comminuting after passing the chipper 1, will retain the average dimensions to which they were comminuted in chipper 1. Frequently good results are obtained with chips having a thickness of between 0.3 and 1 mm. or most preferably a thickness of about 0.4 mm. However, the dimensions of these chips may vary within very broad ranges, from about 10×40 mm., down to nearly the fineness of sawdust. Frequently the average dimensions of the chips for the core layer may be such as to allow passage through a screen of 8 mm. mesh width.

From chipper 1, the chips are conveyed into wet hopper 2 and from there through drier 3. Wet hopper 2 serves to equalize the moisture of the wood, generally to between 15 and 75, and preferably to about 40% of the weight of completely dry wood.

While passing through drier 3, the chips are dried to a water content of preferably between about 2 and 6% and most preferably about 3.5%, and thereafter the chips are conveyed to dry chip hoppers 4. The chips will rest in hoppers 4 for some length of time in order to further equalize the moisture content of the chips and, furthermore, in order to assure continuous operation of the press by holding a reserve quantity of chips in hopper 4 which may be used up in case introduction of additional chips into hopper 4 is interrupted, or the rate of introduction of chips into hopper 4 is temporarily reduced to below the rate of withdrawal of chips from the hopper 4.

The chips then pass, preferably over scales, into mixing device 5, i.e., into a device for admixing an aqueous suspension of synthetic resin binder by spraying the same onto the chips. This suspension preferably will consist of between 38 and 55% by weight of pulverulent synthetic binder, the balance being water, and most preferably, the suspension will contain about 50% of pulverulent synthetic resin binder, as more fully described in my copending application Ser. No. 194,449. As such binder, a synthetic-resin cement may be used, for instance, on the basis of urea formaldehyde, or a phenolic resin or a melamine resin. The water of the binder suspension is absorbed by the dry chips, while the suspended synthetic resin particles will adhere to the surface of the chips.

Thus, the chips will not become adhesive at this point but will only appear to be somewhat more moist, however, the thus treated chips still form a flowable mass.

The chips are now distributed in a preferably continuous manner on conveyor sheets 7. The chips fall on conveyor sheets 7 as a thin veil having a width of for instance 1.75 meters.

Up to this point, the process is substantially similar to that described in my application 194,449, however, it must be remembered, that according to the present invention, only the core plate is formed in the manner described up to now.

From here on, again substantially in the manner described in application Ser. No. 194,449, but limited to a single layer of chips on the conveyor sheet, the sheets with the layer of latently adhesive chips thereon pass scale 8 and are introduced from there into a first press 9 wherein the layer of chips is subjected to a pressure of preferably between 3 and 12 atmospheres above atmospheric pressure. The thus preliminary pressed layer of chips is then subjected to further pressure in heated press 10, preferably at a pressure of between about 12 and 16 atmospheres and a temperature of between 120° and 180° C., more preferably about 140° C., or in certain cases, about 170° C. Pressing in heated press 10 preferably is carried out for a period of between 0.3 and 1.0 minute for each millimeter thickness of the thus formed pressed core plate. The thickness of the core plates may vary greatly, generally between about 5 and 75 mm., however, these dimensions are given by way of example only, not as limiting the invention.

The thus formed crude core plates are then trimmed in trimmer 11 and the plates leaving trimmer 11, while still hot, namely having a temperature preferably of at least about 100° C., are passed through planers 12 and 14 with interposed turning device 13 so that both faces of the core plates are planed. The layer which is removed by planing may have a thickness of for instance up to 2 mm. and the shavings produced by planing both sides of the crude core plate may equal between about 2 and 12% of the weight of the plate.

In this manner, leaving planer 14, a core plate is produced which has parallel, even planar opposite surfaces.

On one of both sides of the thus produced core plate, surface layers are now formed which may be produced, for instance, by applying a thin layer of fine chips to the planar surface of the core plate and compressing the same as will be described in detail further below; or by applying a cover layer in the manner in which fibrous plates, for instance the type of plates known as Pavatex plates are produced.

The schematic drawing shows that the finished core plate may be either introduced into production line IIa, wherein cover layers of fine chips are applied to the core plate, or into production line IIb wherein cover layers of fibrous nature are applied. Production line I indicates the above-described steps or stations required for producing the core plate.

Referring first to production line IIa, the fine chips are produced by passage through chipper 15 and subsequently arranged mill 16. The term "mill" is meant very broadly to denote any type of machinery which will further comminute the chips as they are produced in chipper 15, and thereby possibly even defibrate the same. After the chips have been reduced in size in mill 16 to the desired dimensions, they are introduced into a wet hopper 17 and pass from there through drier 18 and dry hopper 19 to a binder admixing device 20, substantially as described in connection with the treatment of the chips forming the core plate according to production line I. After admixing of the binder in the manner described in connection with arrangement 5 of line I, the latently adhesive chips are passed in part, at 22, on conveyor sheet 21, to form a layer thereon. At 23, the core plate which has been finished in planer 14 is superposed upon the layer of chips on the conveyor sheet, and at 24 a further layer of fine chips is formed on the upper, free, planar face of the core plate. A conveyor sheet carrying in the indicated sequence a first layer of latently adhesive chips, a core plate and a second layer of latently adhesive chips passes then into heated press 25, wherein the composite plate is formed by hot pressing in a manner substantially similar to that described in connection with heated press 10.

From heated press 25, the thus completed composite, compressed plate preferably passes through cooling channel 26 and is then ready for further use, sale or storage. If desired, the cooled plates, for instance, leaving cooling channel 26 may be subjected to slight surface grinding in contact grinder 27. It is stressed that contact grinder 27 generally will not serve to take off an entire surface layer of the plate, this being unnecessary due to the fact that the cover plate has substantially planar surfaces since the core plate has been subjected to planing at 14 and the relatively thin surface layers of the composite plate can be controlled so as to be of substantially even thickness throughout.

When it is desired to form the outer layers of the composite plate of a layer of fibrous material, the further processing of the core plate leaving planer 14 may be carried out as schematically illustrated in production line IIb.

The chips, or other fibrous material which is to form the surface layer or layers of the composite plate, pass through a suitable chipper 28, from there to a grader 29 from which larger particles are returned to chipper 28 and the particles of desired small size are passed to hopper 30. From hopper 30, the size graded chips are introduced into preheater 31. Preheater 31 preferably is constructed as a screw conveyor which is completely submerged in warm water. By passing through preheater 31, the chips are softened so that, in defibrator 32, the chips can be separated into fibers. The wet fibrous pulp may be further worked up in wet or dry condition, in accordance with substantially conventional methods. In the illustrated case, the fibrous pulp is passed through drier 33 in order to reduce its moisture content. The thus dried fiber mass passes then through binder admixing device 34 which operates substantially as described in connection with binder admixing devices 5 and 20, and from there a layer or fleece of latently adhesive fibrous material is passed to distribution station 35-37, wherein first a layer of fibrous material is formed on a conveyor sheet, then the core plate from planer 14 is superposed thereon and then another layer of fibrous, latently adhesive material is superposed upon the free upper face of the core plate at 37.

The thus formed composite arrangement is then subjected to heat pressing in heated press 38 which corresponds to heated press 25, and passes from there through cooling channel 39 and, if desired, contact grinder 40 in a manner similar to that described with respect to items 25, 26 and 27 of line IIa.

It will be understood, however, that the outer layer of the composite plate may also be formed in a different manner, for instance, in the case of a fibrous glass fleece, the same may be introduced directly into binder admixing device 34, omitting stations 28–33.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

The core layer may by itself be made out of several layers.

The surface of a plate made by said process fits especially well to be refined without pretreatment. This plate may be covered by a P.V.C.-foil or resin-steeped paper. As the cover layer has to bring a refinement of the plate surface by sealing-character and is not a stressed covering layer, this cover layer must be of a thickness only to cover the porosities of the core layer and to prevent irregularities of chips to shine through. This must be done in any case, if the surface is aftertreated, as for example printed with any colors or varnishes, sprayed, glued for putting foils or sheets on it. The thickness of the cover layer therefor depends on the quality of the surface of the core layer and also from the process of manufacture of the core layer.

In production line IIa it is preferable to use first class material of light color. These chips can also be spread on a special metal sheet, which may be highly polished. This sheet may be a single sheet or a band-conveyor.

What is claimed as new and desired to be secured by Letters Patent is:

1. A method of producing a composite plate of substantially uniform thickness, comprising the steps of transforming a layer consisting of a deformable, hardenable mass into a solid plate so that the opposite surfaces of said plate are substantially parallel but uneven; removing surface portions from at least one of said opposite surfaces of said solid plate so as to convert the same into an even surface; contacting the thus formed even surface with a layer of substantially uniform thickness and consisting essentially of a mixture of particulate solid material adapted to form at least part of the surface layer of a composite plate, and of a binder material adapted to become actively adhesive when heated to a predetermined elevated temperature; and compressing said layer of substantially uniform thickness in contact with said even surface of said solid plate at at least said predetermined elevated temperature, so as to form on said even surface of said solid plate, firmly adhering thereto, a solid layer of uniform thickness having an outer surface, thereby forming a composite plate having an even, planar face constituted by said outer surface.

2. A method according to claim 1, wherein said deformable hardenable mass consists essentially of a mixture of wood particles and synthetic binder material, and wherein said transforming thereof into a solid plate is carried out by compressing the same.

3. A method according to claim 2, wherein said removing of surface portions of said solid plate is carried out by planing.

4. A method according to claim 3, wherein said planing is carried out while said compressed plate is still hot.

5. A method according to claim 1, wherein said particulate solid material adapted to form at least part of the surface layer of a composite plate is a cellulosic fibrous material.

6. A method according to claim 1, wherein said particulate solid material adapted to form at least part of the surface layer of a composite plate consists essentially of glass fibers.

7. A method according to claim 1, wherein said particulate solid material adapted to form at least part of the surface layer of a composite plate is a fibrous fleece.

8. A method according to claim 1, and including the step of coating at least a portion of the thus formed planar surface with a synthetic resin.

9. A method according to claim 1, wherein said step of compressing said layer of deformable hardenable mass and said step of compressing said layer of substantially uniform thickness in contact with said even surface of said solid plate are carried out successively in the same heated press.

10. A method according to claim 1, and including the step of subjecting said even, planar surface of said composite plate to grinding.

References Cited
UNITED STATES PATENTS

| | | | |
|---|---|---|---|
| 2,686,143 | 8/1954 | Fahrni | 156—62.8 |
| 2,851,730 | 9/1958 | Wilhelm et al. | 264—113 |
| 2,992,152 | 7/1961 | Chapman | 264—113 X |
| 3,011,938 | 12/1961 | Chapman | 156—62.2 X |
| 3,115,431 | 12/1963 | Stokes et al. | 264—113 |
| 3,171,872 | 3/1965 | Jarrett et al. | 264—113 |
| 3,243,327 | 3/1966 | Hoppeler | 156—62.2 |
| 2,067,012 | 1/1937 | Loetscher | 161—246 |

EARL M. BERGERT, *Primary Examiner.*

M. L. KATZ, *Assistant Examiner.*